US012125243B2

(12) United States Patent
Hama et al.

(10) Patent No.: US 12,125,243 B2
(45) Date of Patent: Oct. 22, 2024

(54) INSPECTION DEVICE, IMAGE FORMING APPARATUS, AND NON-TRANSITORY COMPUTER READABLE MEDIUM STORING INSPECTION PROGRAM

(71) Applicant: FUJIFILM Business Innovation Corp., Tokyo (JP)

(72) Inventors: Daigo Hama, Kanagawa (JP); Kiyotaka Tsuchibuchi, Kanagawa (JP); Rina Takeuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 457 days.

(21) Appl. No.: 17/344,935

(22) Filed: Jun. 10, 2021

(65) Prior Publication Data

US 2022/0172400 A1 Jun. 2, 2022

(30) Foreign Application Priority Data

Nov. 30, 2020 (JP) ................................ 2020-198469

(51) Int. Cl.
*G06T 7/90* (2017.01)
*G06T 1/00* (2006.01)
(Continued)

(52) U.S. Cl.
CPC .............. *G06T 7/90* (2017.01); *G06T 1/0007* (2013.01); *G06T 7/001* (2013.01); *G06T 1/20* (2013.01)

(58) Field of Classification Search
CPC ......... G06T 7/90; G06T 1/0007; G06T 7/001; G06T 1/20; G06T 2207/10008;
(Continued)

(56) References Cited

U.S. PATENT DOCUMENTS 8,391,585 B2 * 3/2013 Kuchii ..................... G06T 7/13
382/141
10,657,635 B2 * 5/2020 Kaneko .................. G06T 7/001
(Continued)

FOREIGN PATENT DOCUMENTS

JP 2002008029 1/2002
JP 2016063368 A * 4/2016
(Continued)

OTHER PUBLICATIONS

"Notice of Reasons for Refusal of Japan Counterpart Application", issued on Aug. 27, 2024, with English translation thereof, p. 1-p. 5.

*Primary Examiner* — Emily C Terrell
*Assistant Examiner* — Stefano Anthony Dardano
(74) *Attorney, Agent, or Firm* — JCIPRNET

(57) ABSTRACT

An inspection device includes a processor configured to acquire image information of each of a correct image and a target image as an inspection target, extract edge information of each of the correct image and the target image by using the acquired image information, obtain a difference image between the correct image and the target image, and change a threshold value for detecting a defect by using brightness information or color information of the correct image along with the edge information and detect a defect of the target image by using the difference image and the threshold value.

20 Claims, 11 Drawing Sheets

(51) Int. Cl.
*G06T 1/20* (2006.01)
*G06T 7/00* (2017.01)

(58) Field of Classification Search
CPC ........... G06T 2207/10024; G06T 2207/30144; H04N 1/00005; H04N 1/00037
See application file for complete search history.

(56) References Cited

U.S. PATENT DOCUMENTS

| | | |
|---|---|---|
| 2015/0220809 A1 | 8/2015 | Kawabata et al. |
| 2015/0221077 A1* | 8/2015 | Kawabata ............... G06T 7/337 |
| | | 382/141 |
| 2016/0292661 A1* | 10/2016 | Kwan .................... H04N 7/181 |
| 2018/0108122 A1 | 4/2018 | Fukase |
| 2019/0171900 A1* | 6/2019 | Thrasher ................ G06V 10/28 |
| 2019/0289152 A1* | 9/2019 | Tsue ....................... H04N 1/409 |
| 2020/0058115 A1* | 2/2020 | Mimura ............. H04N 1/00005 |

FOREIGN PATENT DOCUMENTS

| | | |
|---|---|---|
| JP | 6007690 | 10/2016 |
| JP | 2017090444 | 5/2017 |
| JP | 2018155736 | 10/2018 |
| WO | 20115114833 | 8/2015 |

* cited by examiner

FIG. 4
CORRECT IMAGE
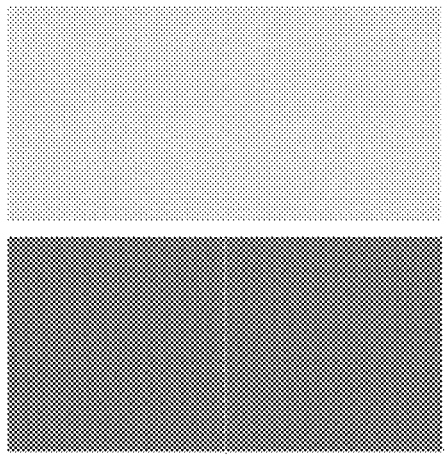
TARGET IMAGE
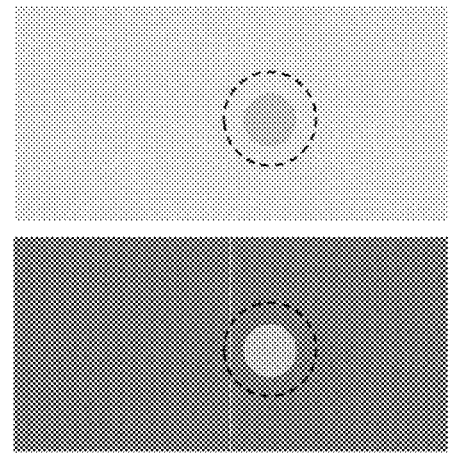
CORRECT IMAGE
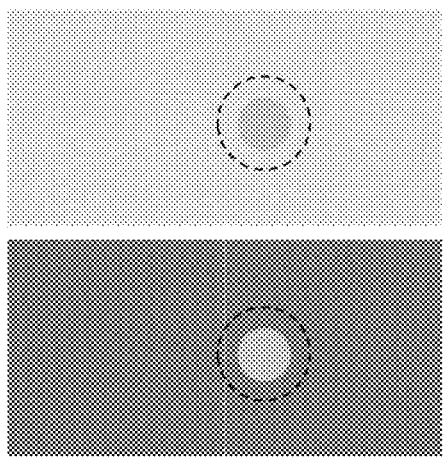
TARGET IMAGE
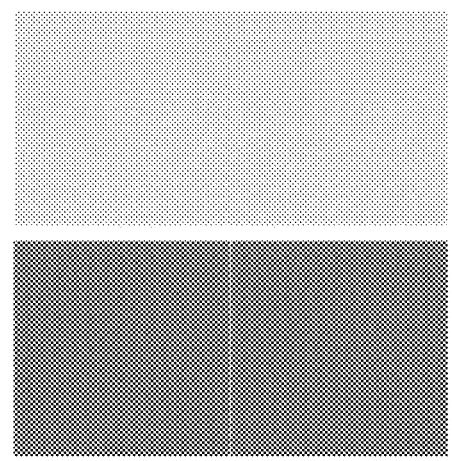

FIG. 8

| CORRECT IMAGE EDGE | | TARGET IMAGE EDGE | | CORRECT IMAGE BRIGHTNESS | THRESHOLD VALUE | |
|---|---|---|---|---|---|---|
| YES | NO | YES | NO | | − (OMISSION) | + (ADDITION) |
|  | ○ |  | ○ | BRIGHT | 100 | 100 |
|  | ○ |  | ○ | DARK | 100 | 100 |
|  | ○ | ○ |  | BRIGHT | 50 | 50 |
|  | ○ | ○ |  | DARK | 50 | 50 |
| ○ |  |  | ○ | BRIGHT | 100 | 150 |
| ○ |  |  | ○ | DARK | 150 | 100 |
| ○ |  | ○ |  | BRIGHT | 75 | 150 |
| ○ |  | ○ |  | DARK | 150 | 75 |

FIG. 10

| CORRECT IMAGE EDGE | | CORRECT IMAGE EXTENDED EDGE | | TARGET IMAGE EDGE | | TARGET IMAGE EXTENDED EDGE | | CORRECT IMAGE BRIGHTNESS | THRESHOLD VALUE − (OMISSION) | THRESHOLD VALUE + (ADDITION) |
|---|---|---|---|---|---|---|---|---|---|---|
| YES | NO | YES | NO | YES | NO | YES | NO | | | |
| | ○ | | ○ | | ○ | | ○ | BRIGHT | 100 | 100 |
| | ○ | | ○ | | ○ | | ○ | DARK | 100 | 100 |
| | ○ | | ○ | | ○ | ○ | | BRIGHT | 75 | 75 |
| | ○ | | ○ | | ○ | ○ | | DARK | 75 | 75 |
| | ○ | | ○ | ○ | | ○ | | BRIGHT | 50 | 50 |
| | ○ | | ○ | ○ | | ○ | | DARK | 50 | 50 |
| | ○ | ○ | | | ○ | | ○ | BRIGHT | 100 | 125 |
| | ○ | ○ | | | ○ | | ○ | DARK | 125 | 100 |
| | ○ | ○ | | | ○ | ○ | | BRIGHT | 87.5 | 125 |
| | ○ | ○ | | | ○ | ○ | | DARK | 125 | 87.5 |
| | ○ | ○ | | ○ | | ○ | | BRIGHT | 81.25 | 137.5 |
| | ○ | ○ | | ○ | | ○ | | DARK | 137.5 | 81.25 |
| ○ | | ○ | | | ○ | | ○ | BRIGHT | 100 | 150 |
| ○ | | ○ | | | ○ | | ○ | DARK | 150 | 100 |
| ○ | | ○ | | | ○ | ○ | | BRIGHT | 81.25 | 137.5 |
| ○ | | ○ | | | ○ | ○ | | DARK | 137.5 | 81.25 |
| ○ | | ○ | | ○ | | ○ | | BRIGHT | 75 | 150 |
| ○ | | ○ | | ○ | | ○ | | DARK | 150 | 75 |

INSPECTION DEVICE, IMAGE FORMING APPARATUS, AND NON-TRANSITORY COMPUTER READABLE MEDIUM STORING INSPECTION PROGRAM

CROSS-REFERENCE TO RELATED APPLICATIONS

This application is based on and claims priority under 35 USC 119 from Japanese Patent Application No. 2020-198469 filed Nov. 30, 2020.

BACKGROUND

(i) Technical Field

The present invention relates to an inspection device, an image forming apparatus, and a non-transitory computer readable medium storing an inspection program.

(ii) Related Art

JP6007690B proposes an image inspection device that inspects a read image obtained by reading an image output after the image is formed on a paper surface by an image forming apparatus having a plurality of image processing functions. Specifically, it is proposed that the image inspection device generates an inspection image by performing image processing having the content in accordance with the information format of an output target image, and determines a defect in the read image based on a difference between the generated inspection image and the read image. JP6007690B also proposes that the image inspection device extracts an edge and changes a threshold value to expand an allowable range for the difference between the inspection image and the read image for the edge portion.

SUMMARY

In a case where a correct image and a target image as an inspection target are collated with each other, a decrease of a threshold value for detecting a defect of an edge portion may causes detection of the defect of the edge portion not to be possible. Aspects of non-limiting embodiments of the present disclosure relate to an inspection device, an image forming apparatus, and a non-transitory computer readable medium storing an inspection program that are capable of improving defect detection accuracy in comparison to a case where a threshold value for detecting a defect of an edge portion is simply decreased, and a correct image and a target image are collated with each other.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

To achieve the above object, according to an aspect of the present disclosure, there is provided inspection device including a processor configured to acquire image information of each of a correct image and a target image as an inspection target, extract edge information of each of the correct image and the target image by using the acquired image information, obtain a difference image between the correct image and the target image, and change a threshold value for detecting a defect by using brightness information or color information of the correct image along with the edge information and detect a defect of the target image by using the difference image and the threshold value.

BRIEF DESCRIPTION OF THE DRAWINGS

Exemplary embodiment(s) of the present invention will be described in detail based on the following figures, wherein:

FIG. 4 is a diagram illustrating a case where only a target image has an edge and a case where a black spot and a white spot in a correct image are lost in printing, and thus are not in the target image;

FIG. 8 is a diagram illustrating an example of a threshold value table;

FIG. 10 is a diagram illustrating an example of the threshold value table in a case of using edge peripheral information.

DETAILED DESCRIPTION

Figure 1:
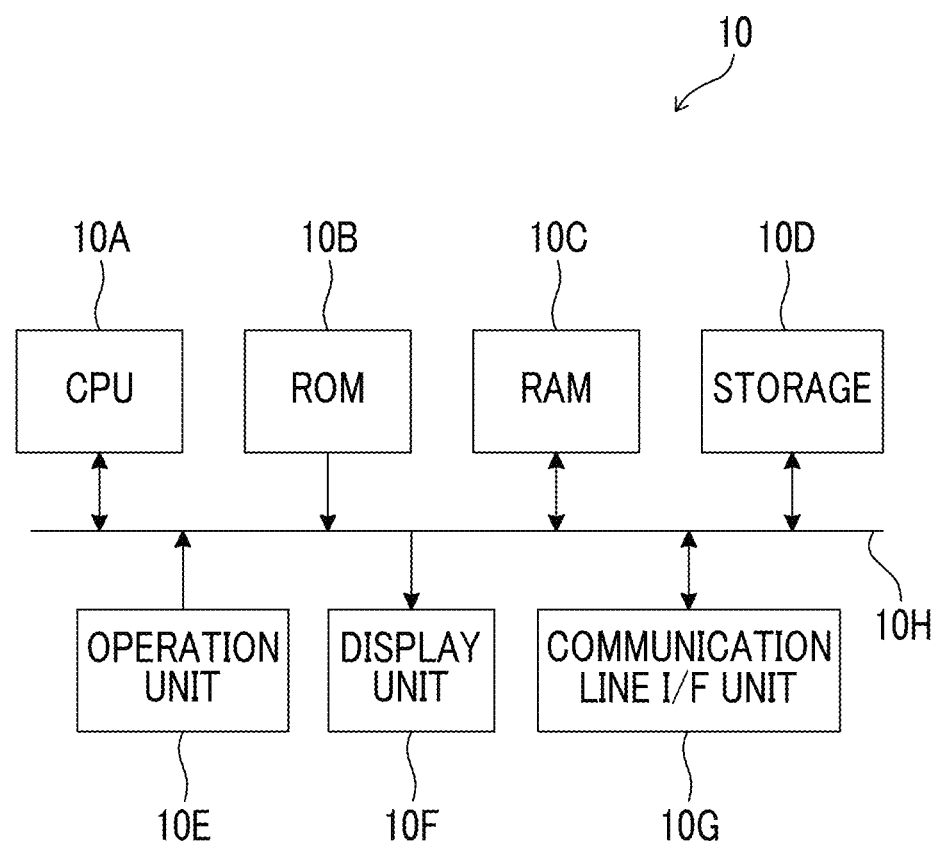
FIG. 1 is a schematic diagram illustrating a configuration of an inspection device according to an exemplary embodiment.

Hereinafter, examples of exemplary embodiments of the present invention will be described in detail with reference to the drawings. FIG. 1 is a schematic diagram illustrating a configuration of an inspection device according to a first exemplary embodiment.

An inspection device 10 according to the present exemplary embodiment executes a process of inspecting a defect of an image by comparing a correct image with an image as an inspection target. In the following description, the image as the inspection target is referred to as a target image.

Examples of defects of an image in the present exemplary embodiment include omission of an image, addition of an image due to dust or the like, and distortion of the image, in the target image in comparison to the correct image. In the present exemplary embodiment, as an example, the inspection device 10 as follows will be described. The inspection device performs an inspection in which digital image information (for example, information obtained by converting and generating a PDL (page description language) file into a raster image) that functions as a base of image formation is used as the correct image, and image information obtained by forming an image based on the image information of the correct image and reading a recording medium such as paper is set as the target image for the inspection. Among defects of a target image, a defect in which an image which is not provided in the correct image and is provided in the target image is referred to as an addition, and a defect in which an image provided in the correct image is not provided in the target image is referred to as an omission.

The inspection device 10 includes a central processing unit (CPU) 10A as an example of a processor, a read only memory (ROM) 10B, a random access memory (RAM) 10C, a storage 10D, an operation unit 10E, a display unit 10F, and a communication line I/F (interface) unit 10G. The CPU 10A controls the overall operation of the inspection device 10. Various control programs, various parameters, and the like are stored in advance in the ROM 10B. The RAM 10C is used as a work area or the like during execution of various programs by the CPU 10A. Various types of data, application programs, and the like are stored in the storage 10D. The operation unit 10E is used to input various types of information. The display unit 10F is used to display various types of information. The communication line I/F unit 10G is connectable to an external device and transmits and receives various types of data to and from the external device. The above units of the inspection device 10 are electrically connected to each other by a system bus 10H. In the inspection device 10 according to the present exemplary embodiment, the storage 10D is applied as a storage unit, but the present invention is not limited to this. Other non-volatile storage units such as a hard disk and a flash memory may be applied.

With such a configuration, in the inspection device 10 according to the present exemplary embodiment, the CPU 10A performs accesses to the ROM 10B, the RAM 10C, and the storage 10D, acquisition of various types of data via the operation unit 10E, and display of various types of information on the display unit 10F. In the inspection device 10, the CPU 10A performs a control of transmission and reception of various types of data via the communication line I/F unit 10G.

Figure 2:
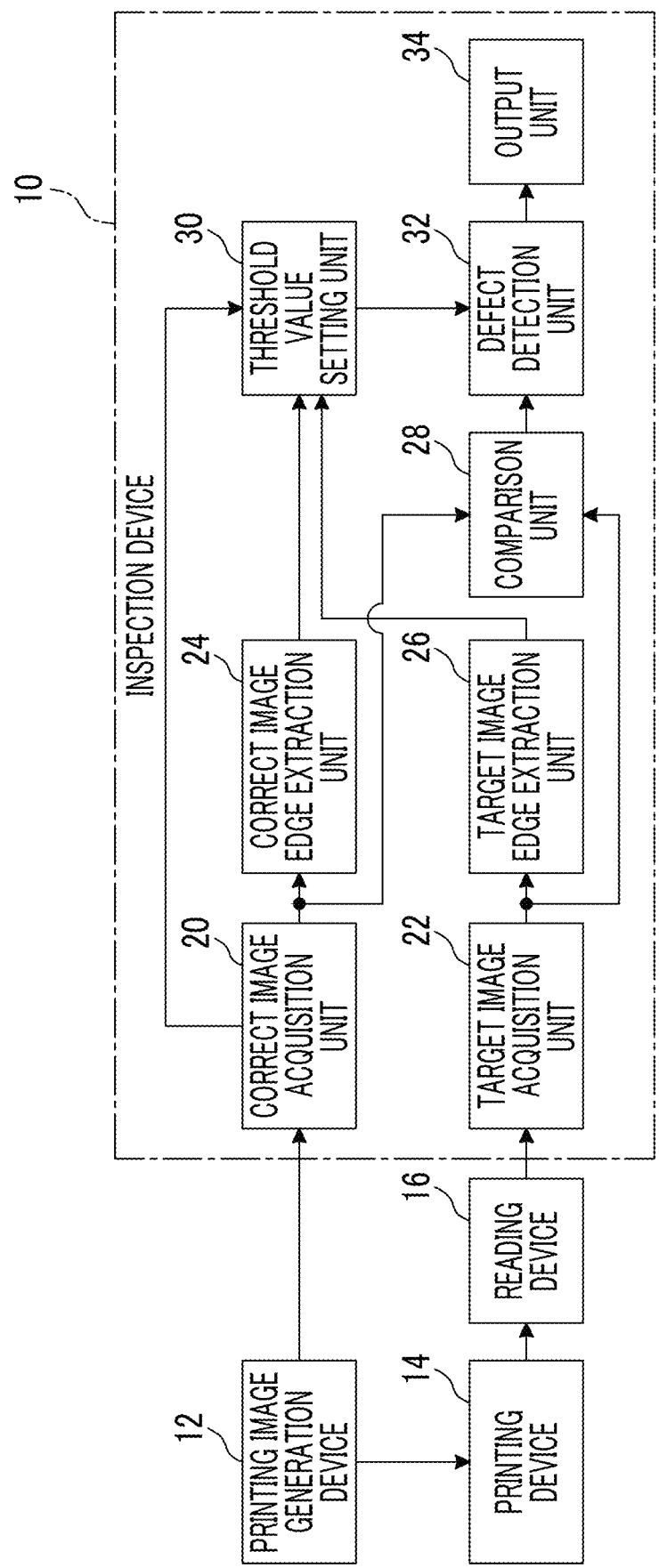
FIG. 2 is a functional block diagram illustrating a functional configuration of the inspection device according to the exemplary embodiment.

Here, a functional configuration realized in a manner that the CPU 10A in the inspection device 10 according to an exemplary embodiment executes a program stored in the ROM 10B will be described. FIG. 2 is a functional block diagram illustrating a functional configuration of the inspection device 10 according to the exemplary embodiment.

As illustrated in FIG. 2, the inspection device 10 has functions of a correct image acquisition unit 20, a target image acquisition unit 22, a correct image edge extraction unit 24, a target image edge extraction unit 26, a comparison unit 28, a threshold value setting unit 30, a defect detection unit 32, and an output unit 34.

The correct image acquisition unit 20 acquires a correct image as a reference for a target image. Regarding the correct image, in the exemplary embodiment, the image information of the correct image generated by a printing image generation device 12 is acquired.

The target image acquisition unit 22 acquires a target image as an inspection target. In the exemplary embodiment, regarding the target image, the target image acquisition unit acquires image information indicating a target image, that is obtained in a manner that a reading device 16 reads a recording medium such as paper on which an image is formed by a printing device 14 based on the image information of the correct image generated by the printing image generation device 12.

The correct image edge extraction unit 24 generates edge information by executing a process of extracting an edge based on the image information of the correct image acquired by the correct image acquisition unit 20.

The target image edge extraction unit 26 generates edge information by executing the process of extracting an edge based on the image information of the target image acquired by the target image acquisition unit 22.

The comparison unit 28 performs alignment between the correct image and the target image by comparing the correct image with the target image, and performs comparison between the correct image and the target image by calculating a difference between the correct image and the target image.

The threshold value setting unit 30 sets a threshold value for detecting a defect from a difference image between the correct image and the target image. In the exemplary embodiment, the threshold value setting unit 30 acquires brightness information of the correct image from the image information of the correct image acquired by the correct image acquisition unit 20. The threshold value setting unit acquires edge information from each of the correct image edge extraction unit 24 and the target image edge extraction unit 26. The threshold value setting unit sets the threshold value by changing the threshold value for detecting a defect for each pixel by using the brightness information or color information of the correct image along with the edge information of each of the correct image and the target image. For example, the threshold value setting unit sets the threshold value predetermined in accordance with the brightness information or the color information of the correct image along with the edge information of each of the correct image and the target image, for each pixel. Alternatively, the threshold value setting unit may set the threshold value predetermined in accordance with a combination of contrast and whether or not an edge is provided, for each pixel.

The defect detection unit 32 executes a process of determining whether or not there is a defect in the difference image between the correct image and the target image for each pixel, by using the threshold value set by the threshold value setting unit 30.

The output unit 34 executes a process of acquiring the detection result of the defect detection unit 32 and outputting the result obtained by detecting the defect of the target image.

Figure 3:
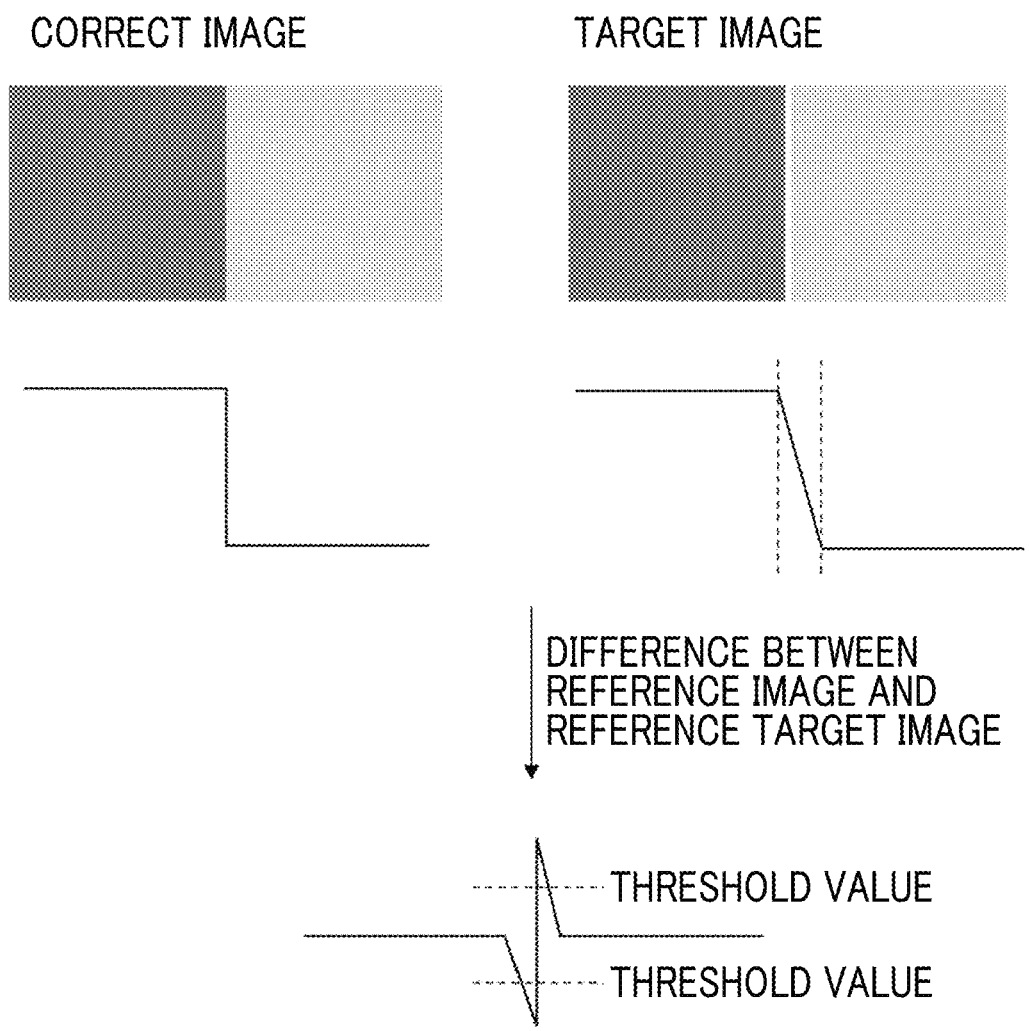
FIG. 3 is a diagram illustrating erroneous detection of a defect caused by a difference between a digital image and an analog image in the vicinity of an edge of an image.

As in the inspection device 10 according to the exemplary embodiment, in a case where an DA inspection is performed, erroneous detection of a defect is likely to occur in the vicinity of the edge of the image by the difference between a digital image and an analog image. For example, as illustrated in FIG. 3, since the correct image is a digital image, but the target image is an analog image, the edge portion is rounded. Thus, in a case where a difference between the correct image and the target image is obtained, the difference may exceed the threshold value for detecting a defect, and thus erroneous detection of the defect may occur.

In the related art, the threshold value for detecting a defect of the edge portion of the correct image is increased to make it difficult to detect the defect. In the related art, as illustrated in the upper portion of FIG. 4, in a case where only the target image has an edge (dotted line portion in the upper portion of FIG. 4), the defect is detected without any problem. On the other hand, as illustrated in the lower portion of FIG. 4, in a case where a black spot and a white spot in the correct image are lost in printing and are not in the target image, and the threshold value of the edge portion is uniquely increased, it is not possible to detect the loss in the printing.

Figure 5:
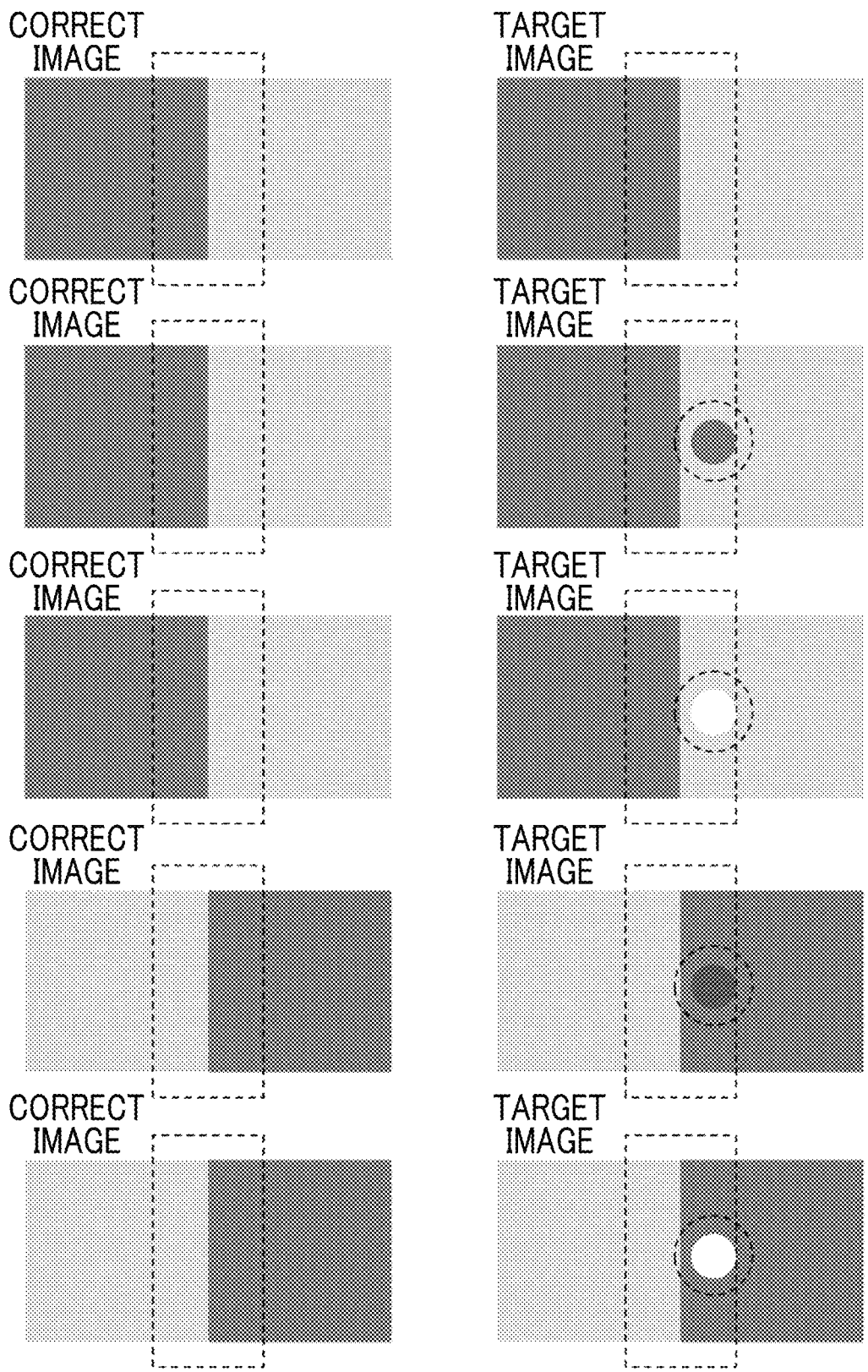
FIG. 5 is a diagram illustrating an example of a detectable defect and an undetectable defect in the related art in which a threshold value for detecting a defect of an edge portion of the correct image is increased to make it difficult to detect the defect.

Specifically, as illustrated in the first row from the top in FIG. 5, in a case where there is no omission or addition of an image in an edge region indicated by a dotted line, the erroneous detection of the edge portion as a defect is prevented by changing the threshold value. A black spot in the dotted circle region in the second row from the top in FIG. 5 and a white spot in the dotted circle region in the fifth row from the top in FIG. 5 are detected even though the threshold value is increased.

On the other hand, as in the dotted circle region in the third and the fourth rows from the top in FIG. 5, in a case where a black spot and a white spot generated on the target image by printing are in the vicinity of the edge region, the defect is not detected in a case where the threshold value of the edge is uniquely increased.

Thus, in a case where the threshold value of the edge portion is uniquely changed, the followings may occur. That is, omission (for example, character such as a dot) in a case where the correct image has an edge may occur, a character may be filled (for example, white character), an image in a bright background in the vicinity of the edge may be omitted, and an image and the like added in a dark background in the vicinity of the edge may not be detected.

Thus, the inspection device 10 according to the exemplary embodiment executes a process of changing the threshold value for detecting a defect by using the edge information of each of the correct image and the target image and the brightness information of the correct image, and detecting a defect of the target image. That is, the defect detection accuracy is improved by changing the threshold value for detecting a defect by using not only the edge information but also the brightness information of the correct image.

Thus, as illustrated in the first row from the top in FIG. 5, in a case where the correct image and the target image have an edge portion, an occurrence of erroneous detection of the edge portion is reduced by changing the threshold value for detecting a defect by using not only the edge information but also the brightness information of the correct image.

In addition, as illustrated in the second and subsequent rows from the top in FIG. 5, even in a case where the black spot and the white spot generated on the target image in printing are in the vicinity of the edge, in the exemplary embodiment, the threshold value for omission is set to be low in a bright region, and the threshold value for addition is set to be low in a dark region. With such a method, the detection accuracy is improved.

Figure 6:
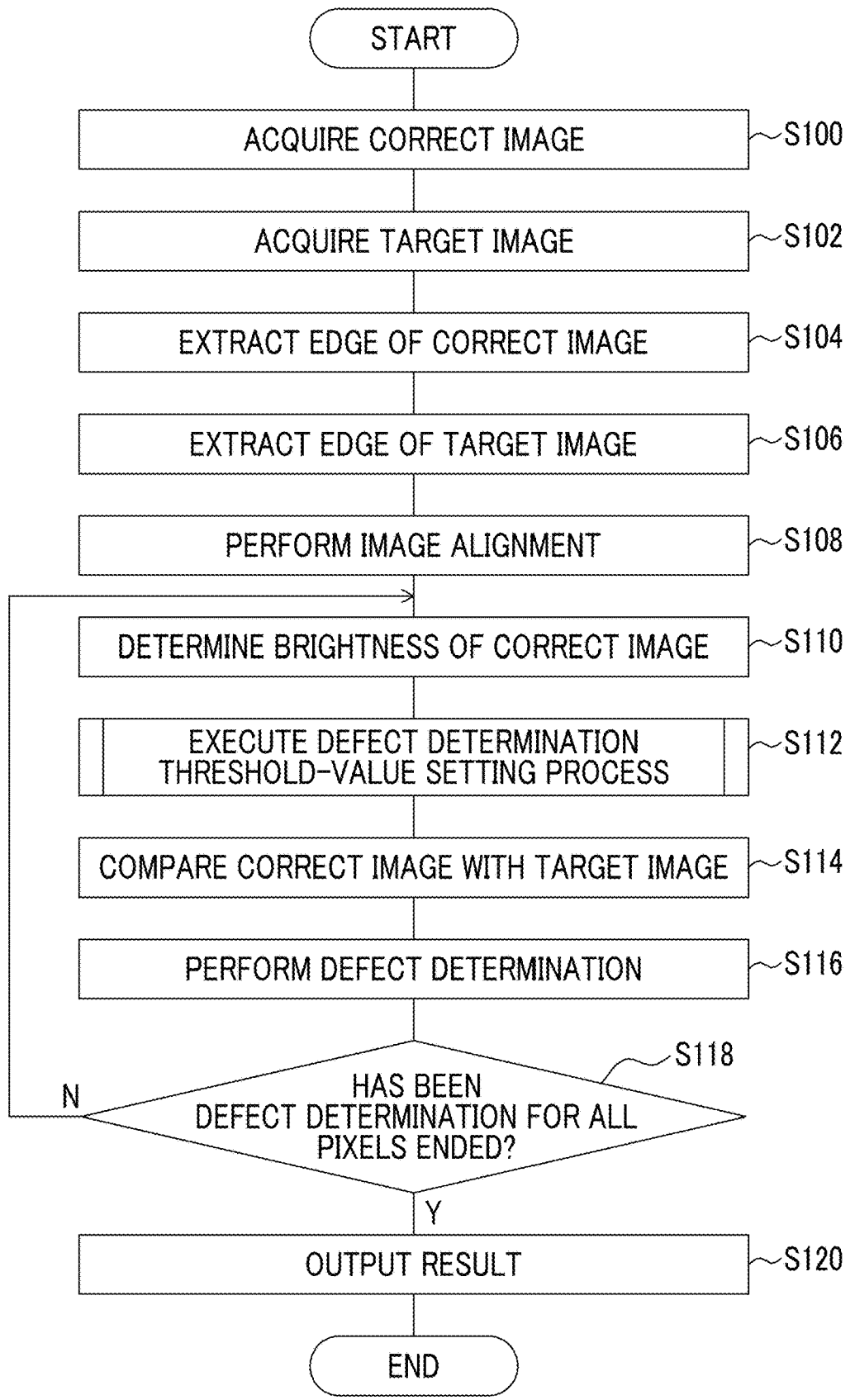
FIG. 6 is a flowchart illustrating an example of a flow of a process executed by the inspection device according to the exemplary embodiment.

Next, a specific process executed by the inspection device 10 configured as described according to the exemplary embodiment will be described. FIG. 6 is a flowchart illustrating an example of a flow of a process executed by the inspection device 10 according to the exemplary embodiment. The process in FIG. 6 is started in a case where an instruction to start the inspection is issued, for example, by an operation of the operation unit 10E or the like.

In Step S100, the CPU 10A acquires a correct image and proceeds to Step S102. That is, the correct image acquisition unit 20 acquires the image information of the correct image generated by the printing image generation device 12.

In Step S102, the CPU 10A acquires a target image and proceeds to Step S104. That is, the target image acquisition unit 22 acquires the image information indicating a target image, that is obtained in a manner that a reading device 16 reads a recording medium such as paper on which an image is formed by a printing device 14 based on the image information of the correct image generated by the printing image generation device 12. The order of Step S100 and Step S102 may be reversed.

In Step S104, the CPU 10A extracts the edge of the correct image and proceeds to Step S106. That is, the correct image edge extraction unit 24 generates edge information by executing a process of extracting an edge based on the image information of the correct image acquired by the correct image acquisition unit 20.

In Step S106, the CPU 10A extracts the edge of the target image and proceeds to Step S108. That is, the target image edge extraction unit 26 generates edge information by executing the process of extracting an edge based on the image information of the target image acquired by the target image acquisition unit 22. The order of Step S104 and Step S106 may be reversed.

In Step S108, the CPU 10A performs alignment between the correct image and the target image and proceeds to Step S110. That is, the comparison unit 28 compares the correct image with the target image and performs the alignment between the correct image and the target image. Specifically, the image alignment may be a surface process of performing the alignment between the entire surfaces of the correct image and the target image, a pixel process of performing the alignment for each pixel, or a block process of dividing the image into blocks and performing the alignment for each block. The image alignment may be performed after the image is acquired in Step S100 and Step S102.

In Step S110, the CPU 10A determines the brightness of the correct image and proceeds to Step S112. That is, the threshold value setting unit 30 acquires the brightness information of the correct image from the image information of the correct image acquired by the correct image acquisition unit 20, and determines the brightness. Regarding the determination of the brightness of the correct image, for example, the degree of brightness is obtained in a range of 0 to 100. The correct image is determined to be dark in a case where the degree of brightness is smaller than 50, and is determined to be bright in a case where the degree of brightness is equal to or more than 50.

In Step S112, the CPU 10A executes a defect determination threshold-value setting process and proceeds to Step S114. That is, the threshold value setting unit 30 sets the threshold value by changing the threshold value for detecting a defect for each pixel by using the brightness information or color information of the correct image along with the edge information of each of the correct image and the target image. In the exemplary embodiment, the threshold value setting unit executes a process of setting the threshold value predetermined in accordance with the brightness information of the correct image along with the edge information of each of the correct image and the target image, for each pixel. The details of the defect determination threshold-value setting process will be described later.

In Step S114, the CPU 10A compares the correct image with the target image and proceeds to Step S116. In the exemplary embodiment, the comparison unit 28 compares the correct image with the target image by calculating the difference between the correct image and the target image.

In Step S116, the CPU 10A performs defect determination and proceeds to Step S118. That is, the defect detection unit 32 determines whether or not the image has a defect, based on the comparison result between the correct image and the target image. Regarding the defect determination, the defect detection unit determines whether or not the image has a defect, by using the threshold value set in the defect determination threshold-value setting process in Step S112.

In Step S118, the CPU 10A determines whether or not the defect determination for all pixels has been ended. In a case where the CPU determines that the defect determination for all pixels has not been ended, the process returns to Step S110 and the above processes are repeated for other pixels. In a case where the CPU determines that the defect determination for all the pixels has been ended, the process proceeds to Step S120.

In Step S120, the CPU 10A outputs the result obtained by determining the defect of the target image and ends a series of processes. That is, the output unit 34 executes a process of acquiring the detection result of the defect detection unit 32 and outputting the result obtained by detecting the defect of the target image.

Figure 7:
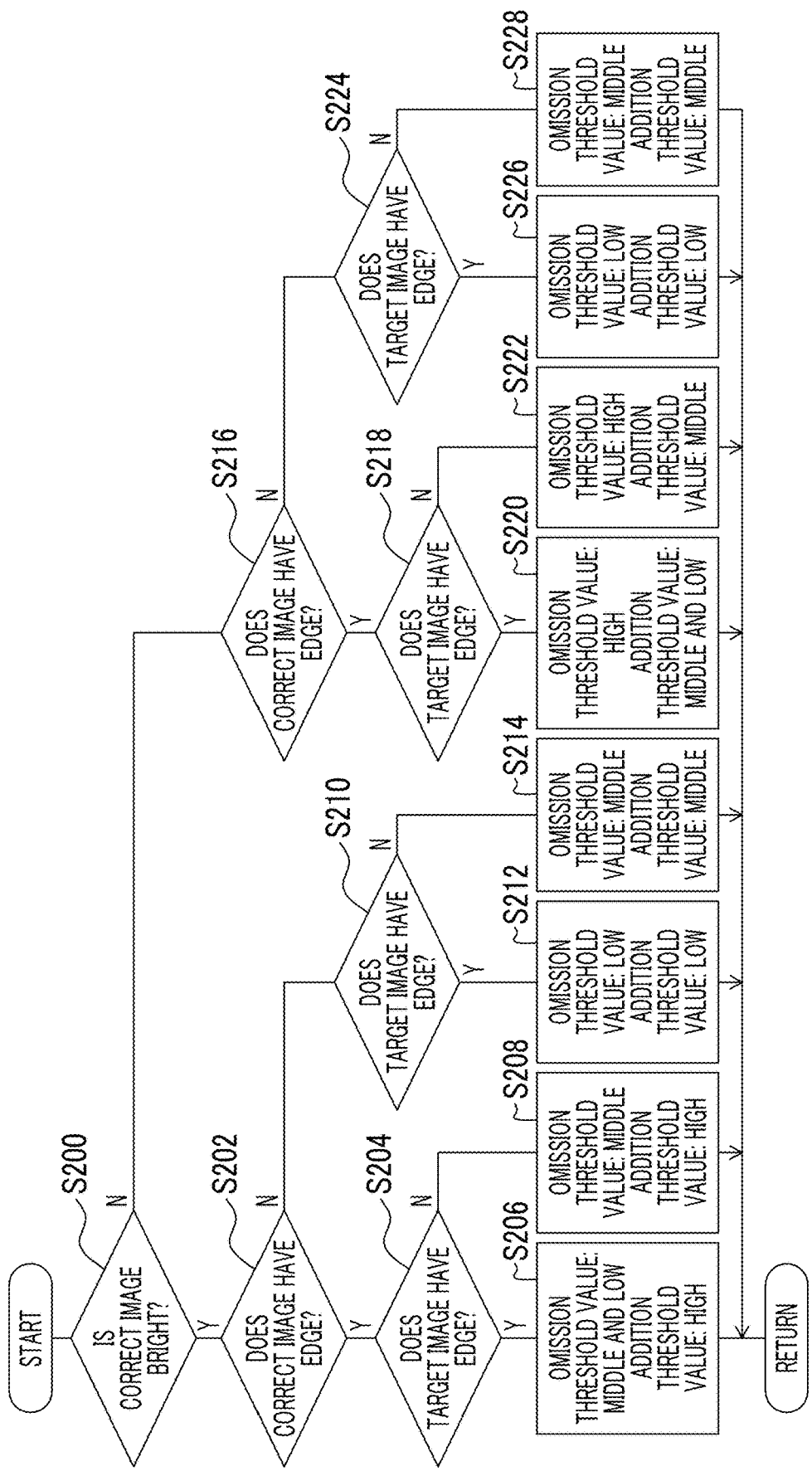
FIG. 7 is a flowchart illustrating an example of a flow of a defect determination threshold-value setting process.

Subsequently, the above-described defect determination threshold-value setting process will be described in detail. FIG. 7 is a flowchart illustrating an example of a flow of the defect determination threshold-value setting process.

In Step S200, the CPU 10A determines whether or not the correct image is bright. The threshold value setting unit 30 performs the determination based on the determination result of the brightness of the correct image in Step S110 described above. In a case where the CPU determines that the correct image is bright, the process proceeds to Step S202. In a case where the CPU determines that the correct image is not bright, the process proceeds to Step S216.

In Step S202, the CPU 10A determines whether or not the correct image has an edge. Regarding the determination, the threshold value setting unit 30 determines whether or not focusing pixels correspond to the edge, based on the edge information of the correct image generated in Step S104 described above. In a case where the CPU determines that the focusing pixels correspond to the edge, the process proceeds to Step S204. In a case where the CPU determines that the focusing pixels do not correspond to the edge, the process proceeds to Step S210.

In Step S204, the CPU 10A determines whether or not the target image has an edge. Regarding the determination, the threshold value setting unit 30 determines whether or not focusing pixels correspond to the edge, based on the edge information of the target image generated in Step S106 described above. In a case where the CPU determines that the focusing pixels correspond to the edge, the process proceeds to Step S206. In a case where the CPU determines that the focusing pixels do not correspond to the edge, the process proceeds to Step S208.

In Step S206, the CPU 10A sets the omission threshold value to a predetermined middle and low value, and sets the addition threshold value to a predetermined high value. For example, in accordance with a predetermined threshold value table illustrated in FIG. 8, the threshold setting unit 30 sets the omission threshold to 75 defined as the middle and low value, and sets the addition threshold to 150 defined as the high value. Then, the process proceeds to Step S114 in FIG. 6.

In Step S208, the CPU 10A sets the omission threshold value to the predetermined middle value and sets the addition threshold value to the predetermined high value. For example, in accordance with the predetermined threshold value table illustrated in FIG. 8, the threshold setting unit 30 sets the omission threshold to 100 defined as the middle value, and sets the addition threshold value to 150 defined as the high value. Then, the process proceeds to Step S114 in FIG. 6.

In Step S210, the CPU 10A determines whether or not the target image has an edge. Regarding the determination, the threshold value setting unit 30 determines whether or not focusing pixels correspond to the edge, based on the edge information of the target image generated in Step S106 described above. In a case where the CPU determines that the focusing pixels correspond to the edge, the process proceeds to Step S212. In a case where the CPU determines that the focusing pixels do not correspond to the edge, the process proceeds to Step S214.

In Step S212, the CPU 10A sets the omission threshold value to a predetermined low value, and sets the addition threshold value to a predetermined low value. For example, in accordance with a predetermined threshold value table illustrated in FIG. 8, the threshold setting unit 30 sets the omission threshold to 50 defined as the low value, and sets the addition threshold to 50 defined as the low value. Then, the process proceeds to Step S114 in FIG. 6.

In Step S214, the CPU 10A sets the omission threshold value to the predetermined middle value and sets the addition threshold value to the predetermined high value. For example, in accordance with the predetermined threshold value table illustrated in FIG. 8, the threshold setting unit 30 sets the omission threshold to 100 defined as the middle value, and sets the addition threshold value to 100 defined as the middle value. Then, the process proceeds to Step S114 in FIG. 6.

In Step S216, the CPU 10A determines whether or not the correct image has an edge. Regarding the determination, the threshold value setting unit 30 determines whether or not focusing pixels correspond to the edge, based on the edge information of the correct image generated in Step S104 described above. In a case where the CPU determines that the focusing pixels correspond to the edge, the process proceeds to Step S218. In a case where the CPU determines that the focusing pixels do not correspond to the edge, the process proceeds to Step S224.

In Step S218, the CPU 10A determines whether or not the target image has an edge. Regarding the determination, the threshold value setting unit 30 determines whether or not focusing pixels correspond to the edge, based on the edge information of the target image generated in Step S106 described above. In a case where the CPU determines that the focusing pixels correspond to the edge, the process proceeds to Step S220. In a case where the CPU determines that the focusing pixels do not correspond to the edge, the process proceeds to Step S222.

In Step S220, the CPU 10A sets the omission threshold to a predetermined high value and sets the addition threshold value to a predetermined middle and low value. For example, in accordance with a predetermined threshold value table illustrated in FIG. 8, the threshold setting unit 30 sets the omission threshold to 150 defined as the high value, and sets the addition threshold to 75 defined as the middle and low value. Then, the process proceeds to Step S114 in FIG. 6.

In Step S222, the CPU 10A sets the omission threshold value to the predetermined high value and sets the addition threshold value to the predetermined middle value. For example, in accordance with a predetermined threshold value table illustrated in FIG. 8, the threshold setting unit 30 sets the omission threshold to 150 defined as the high value, and sets the addition threshold to 100 defined as the middle value. Then, the process proceeds to Step S114 in FIG. 6.

In Step S224, the CPU 10A determines whether or not the target image has an edge. Regarding the determination, the threshold value setting unit 30 determines whether or not focusing pixels correspond to the edge, based on the edge information of the target image generated in Step S106 described above. In a case where the CPU determines that the focusing pixels correspond to the edge, the process proceeds to Step S226. In a case where the CPU determines that the focusing pixels do not correspond to the edge, the process proceeds to Step S228.

In Step S226, the CPU 10A sets the omission threshold value to a predetermined low value, and sets the addition threshold value to a predetermined low value. For example, in accordance with a predetermined threshold value table illustrated in FIG. 8, the threshold setting unit 30 sets the omission threshold to 50 defined as the low value, and sets the addition threshold to 50 defined as the low value. Then, the process proceeds to Step S114 in FIG. 6.

In Step S228, the CPU 10A sets the omission threshold value to the predetermined middle value and sets the addition threshold value to the predetermined middle value. For example, in accordance with the predetermined threshold value table illustrated in FIG. 8, the threshold setting unit 30 sets the omission threshold to 100 defined as the middle value, and sets the addition threshold value to 100 defined as the middle value. Then, the process proceeds to Step S114 in FIG. 6.

In the above exemplary embodiment, the threshold value for detecting a defect is changed by using the edge information of each of the correct image and the target image and the brightness information of the correct image, but color information may be used instead of the brightness information. Here, it is assumed that the color information includes the brightness information.

In a case of using the color information, for example, a raster image processor (RIP) image is used as the correct image, and an image obtained in a manner that the printing device 14 performs printing of the correct image, and then the reading device 16 reads an original image is used as the target image. The correct image and the target image assume, for example, a Lab color space.

Figure 9:
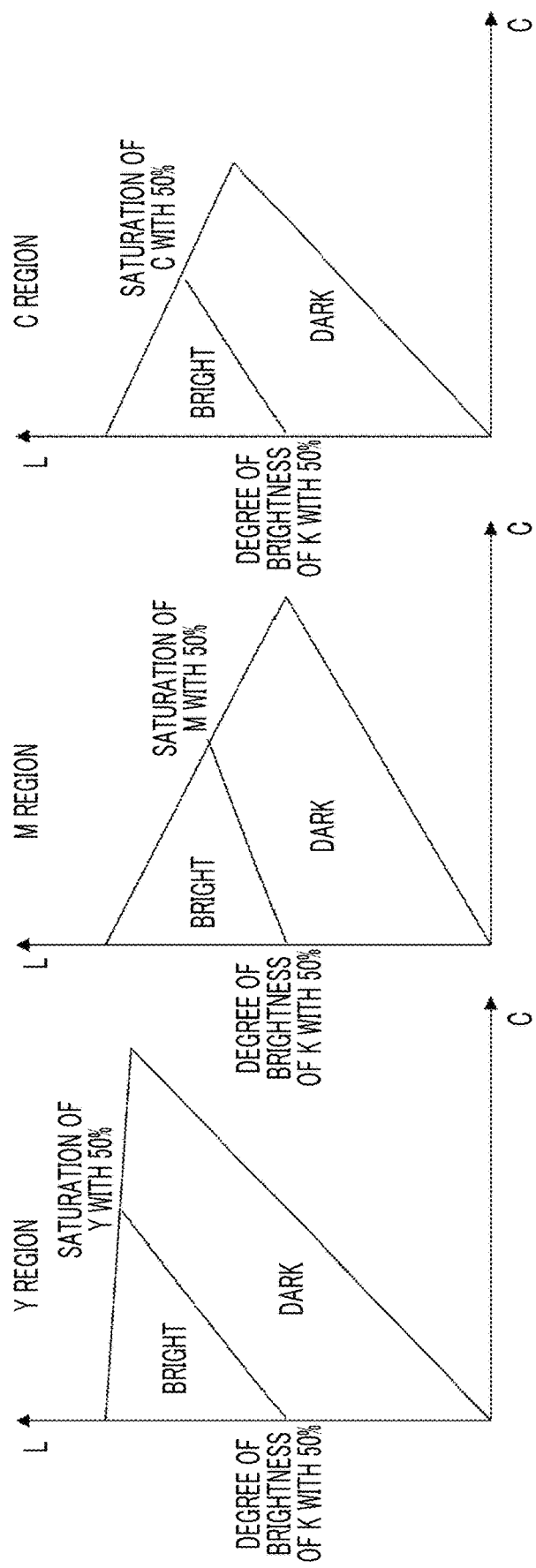
FIG. 9 is a diagram illustrating an example of a determination threshold value predetermined for each color region for brightness determination.

The edge extraction is performed on the L surface or all the Lab surfaces, and the brightness determination in the processes of FIGS. 6 and 7 is changed to the brightness determination for each color region. As illustrated in FIG. 9, the brightness is determined by using a determination threshold value predetermined for each color region. In the example in FIG. 9, in a Y (yellow) region, a line connecting the degree of brightness of K (black) with 50% and the saturation of Y with 50% is set as a determination threshold value for the brightness and darkness. In an M (magenta) region, a line connecting the degree of brightness of K with 50% and the saturation of M with 50% is set as the determination threshold value for the brightness and darkness. In a C (cyan) region, a line connecting the degree of brightness of K with 50% and the saturation of C with 50% is set as the determination threshold value for the brightness and darkness.

In the calculation of the difference image in a case where the correct image and the target image are compared with each other, the difference image is calculated by using a color difference $\Delta E$, and the defect determination is performed in the similar manner to the manner in the above exemplary embodiment.

In this case, the threshold value may be changed to a predetermined threshold value in a case of a predetermined specific color. That is, the threshold value may be changed in a case where a predetermined specific Lab value is obtained. For example, only the threshold value for white may be changed to a threshold value stricter than threshold values for other colors, only the threshold value for red may be changed to a threshold value stricter than threshold values for other colors, or the threshold value for green may be changed to a loose threshold value.

In the above exemplary embodiment, the threshold value for detecting a defect is changed by using the edge information of each of the correct image and the target image and the brightness information of the correct image, but at least one of edge peripheral information and object information may be further used in addition to the edge information. As the edge peripheral information, for example, information of a region obtained by extending several pixels (for example, one or two pixels) from the edge portion is used. The number of pixels extended from the edge portion may be changed according to the resolution. For example, the higher the resolution to be increased, the larger the number of pixels may be.

In a case where the edge peripheral information is further used in the above exemplary embodiment, the threshold value is changed in accordance with a threshold value table illustrated in FIG. 10. FIG. 10 is a diagram illustrating an example of the threshold value table in a case of using edge peripheral information; and In the example of the threshold value table in FIG. 10, in a case where the correct image does not have an edge and an extended edge, the target image does not have an edge and an extended edge, and the brightness of the correct image is bright, the omission threshold value is set to 100, and the addition threshold value is set to 100.

In a case where the correct image does not have an edge and an extended edge, the target image does not have an edge and an extended edge, and the brightness of the correct image is dark, the omission threshold value is set to 100, and the addition threshold value is set to 100.

In a case where the correct image does not have an edge and an extended edge, the target image does not have an edge but has an extended edge, and the brightness of the correct image is bright, the omission threshold value is set to 75, and the addition threshold value is set to 75.

In a case where the correct image does not have an edge and an extended edge, the target image does not have an edge but has an extended edge, and the brightness of the correct image is dark, the omission threshold value is set to 75, and the addition threshold value is set to 75.

In a case where the correct image does not have an edge and an extended edge, the target image has an edge and an extended edge, and the brightness of the correct image is bright, the omission threshold value is set to 50, and the addition threshold value is set to 50.

In a case where the correct image does not have an edge and an extended edge, the target image has an edge and an extended edge, and the brightness of the correct image is dark, the omission threshold value is set to 50, and the addition threshold value is set to 50.

In a case where the correct image does not have an edge but has an extended edge, the target image does not have an edge and an extended edge, and the brightness of the correct image is bright, the omission threshold value is set to 100, and the addition threshold value is set to 125.

In a case where the correct image does not have an edge but has an extended edge, the target image does not have an edge and an extended edge, and the brightness of the correct image is dark, the omission threshold value is set to 125, and the addition threshold value is set to 100.

In a case where the correct image does not have an edge but has an extended edge, the target image does not have an edge but has an extended edge, and the brightness of the correct image is bright, the omission threshold value is set to 87.5, and the addition threshold value is set to 125.

In a case where the correct image does not have an edge but has an extended edge, the target image does not have an edge but has an extended edge, and the brightness of the correct image is dark, the omission threshold value is set to 125, and the addition threshold value is set to 87.5.

In a case where the correct image does not have an edge but has an extended edge, the target image has an edge and an extended edge, and the brightness of the correct image is bright, the omission threshold value is set to 81.25, and the addition threshold value is set to 137.5.

In a case where the correct image does not have an edge but has an extended edge, the target image has an edge and an extended edge, and the brightness of the correct image is dark, the omission threshold value is set to 137.5, and the addition threshold value is set to 81.25.

In a case where the correct image has an edge and an extended edge, the target image does not have an edge and an extended edge, and the brightness of the correct image is bright, the omission threshold value is set to 100, and the addition threshold value is set to 150.

In a case where the correct image has an edge and an extended edge, the target image does not have an edge and an extended edge, and the brightness of the correct image is dark, the omission threshold value is set to 150, and the addition threshold value is set to 100.

In a case where the correct image has an edge and an extended edge, the target image does not have an edge but has an extended edge, and the brightness of the correct image is bright, the omission threshold value is set to 81.25, and the addition threshold value is set to 137.5.

In a case where the correct image has an edge and an extended edge, the target image does not have an edge but has an extended edge, and the brightness of the correct image is dark, the omission threshold value is set to 137.5, and the addition threshold value is set to 81.25.

In a case where the correct image has an edge and an extended edge, the target image has an edge and an extended edge, and the brightness of the correct image is bright, the omission threshold value is set to 75, and the addition threshold value is set to 150.

In a case where the correct image has an edge and an extended edge, the target image has an edge and an extended edge, and the brightness of the correct image is dark, the omission threshold value is set to 150, and the addition threshold value is set to 75.

In a case where the threshold value is changed by further using the object information in addition to the edge information, a threshold value predetermined for each type of object such as a text, graphics, and an image may be set. For example, since erroneous detection of a defect is more likely to occur at the edge portion of text and graphics than an image, the threshold value may be set to be a threshold value higher than the threshold value of the image, and thereby detection of a defect may have a difficulty.

In each of the correct image edge extraction unit 24 and the target image edge extraction unit 26, in a case of extracting the edge, an extraction threshold value used in a case where the edge is extracted by using the object information may be changed. For example, the edge extraction unit changes the extraction threshold value to a value predetermined for each type of object. Specifically, in a case where the object information indicates text and graphics, the extraction threshold value for the edge is set to a value higher than the threshold value of an image. In a case where the object information indicates an image, the extraction threshold value for the edge is set to a value lower than the threshold value of text and graphics. Thus, the edge extraction in accordance with the characteristics of an object is performed.

The inspection device 10 according to the exemplary embodiment may be included in an image forming apparatus having the functions of the printing device 14 and the reading device 16. Alternatively, the inspection device 10 may be included in the image forming apparatus having the functions of the printing device 14 or the reading device 16.

Figure 11:
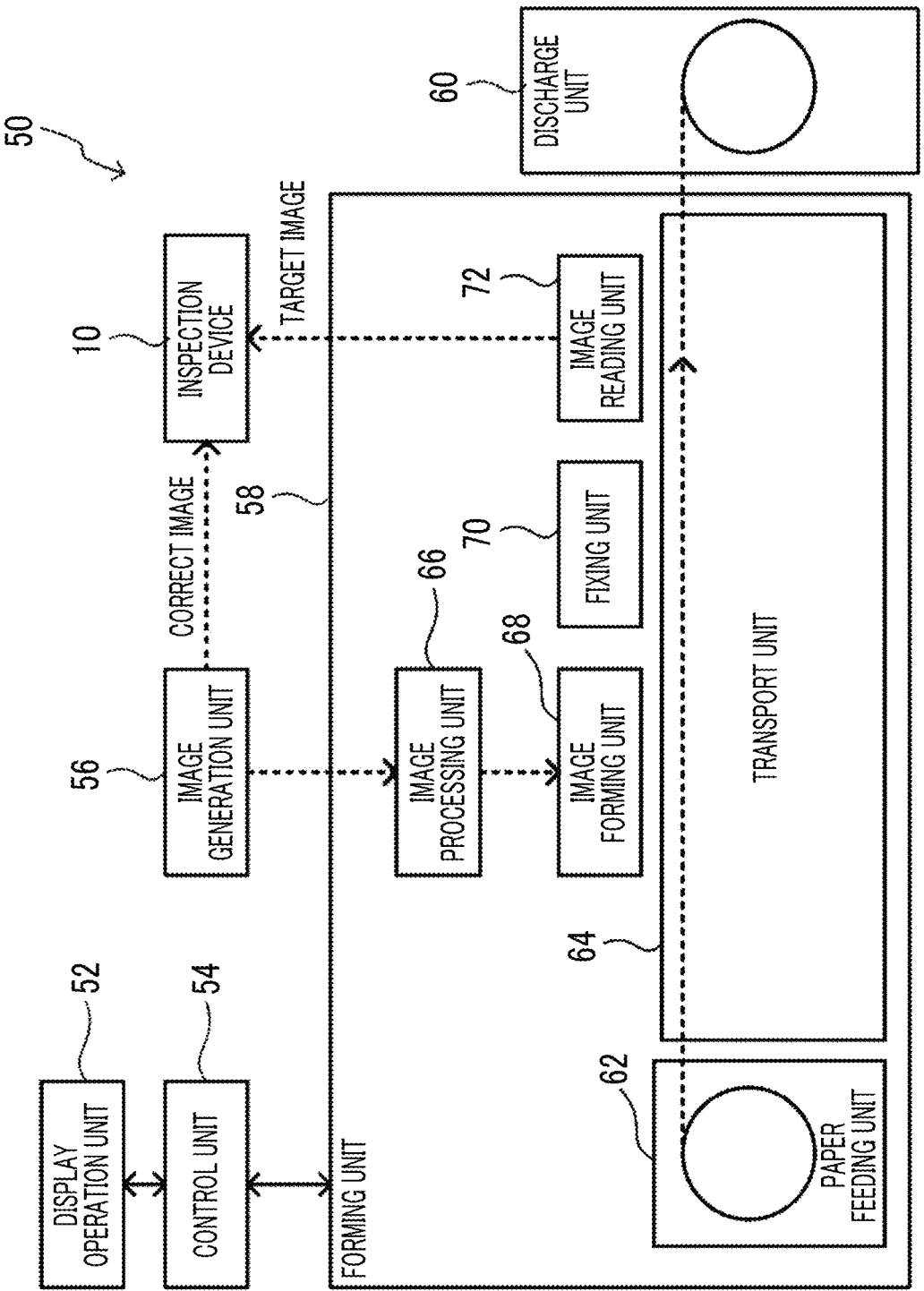
FIG. 11 is a block diagram illustrating an example of a configuration of an image forming apparatus in a case where the image forming apparatus having functions of a printing device and a reading device includes the inspection device according to the exemplary embodiment.

Here, a configuration of an image forming apparatus in a case where the image forming apparatus 50 having the functions of the printing device 14 and the reading device 16 includes the inspection device 10 will be described. FIG. 11 is a block diagram illustrating an example of the configuration of the image forming apparatus in a case where the image forming apparatus 50 having the functions of the printing device 14 and the reading device 16 includes the inspection device 10 according to the exemplary embodiment.

As illustrated in FIG. 11, the image forming apparatus 50 includes a display operation unit 52, a control unit 54, an image generation unit 56, a forming unit 58, and an discharge unit 60.

The display operation unit 52 includes a display unit made of liquid crystal and the like and an operation unit for performing various settings related to image formation. For example, the display operation unit 52 is operated to perform various settings such as various conditions for image formation and the type of recording medium for image formation.

The control unit 54 collectively controls the units of the image forming apparatus 50, and controls the units of the image forming apparatus 50 in accordance with the contents set in the display operation unit 52. The control unit 54 is configured by, for example, a microcomputer including a CPU, a ROM, a RAM, and an input/output unit. A program for controlling the operation for forming an image is stored in the ROM in advance. The operation of each unit in the image forming apparatus 50 is controlled by developing the program into the RAM and the CPU executing the program.

The image generation unit 56 generates image information indicating an original image by reading the original image. Alternatively, the image generation unit generates image information of an original image to be image-formed, by acquiring image information transmitted from an external computer. The inspection device 10 acquires the image information generated by the image generation unit 56, as a correct image.

The forming unit 58 includes a paper feeding unit 62, a transport unit 64, an image processing unit 66, an image forming unit 68, a fixing unit 70, and an image reading unit 72 as a reading unit.

The paper feeding unit 62 accommodates recording paper as the recording medium, and supplies the recording paper to the transport unit 64. For example, the paper feeding unit 62 accommodates roll-shaped recording paper, and the recording paper is pulled out and supplied to the transport unit. Alternatively, the paper feeding unit 62 includes a plurality of accommodation portions for accommodating sheets of paper of different sizes and types. The paper is pulled out from the main portion and supplied to the transport unit. In this case, the paper set by the display operation unit 52 or the like is supplied from each accommodation portion to the transport unit 64. In a case where the image information is acquired from the outside, the paper of the type designated from the outside is supplied from each accommodation portion to the transport unit 64.

The transport unit 64 transports the recording paper or the paper supplied by the paper feeding unit 62 to a position at which an image is formed on the recording paper or the paper, and transports the recording paper or the paper on which the image has been formed, to the discharge unit 60.

The image processing unit 66 receives image information which is generated by the image generation unit 56 or is received from the outside by the image generation unit 56, executes image processing for processing of the image forming unit 68, and outputs image information after the image processing to the image forming unit 68.

The image forming unit 68 receives the image information from the image processing unit 66 and forms an image indicated by the image information, on the recording paper or the paper. For example, the image forming unit 68 may employ an electrophotographic method to transfer the image to the recording paper or the paper, or may employ an inkjet method or the like to form an image by ejecting an ink onto the recording paper or the paper.

The fixing unit 70 executes a process for fixing the image on the recording paper. As the process for fixing the image, the image is fixed on the recording paper or the paper by executing at least one process of pressurization and heating on the recording paper or the paper on which the image has been formed.

The image reading unit 72 reads the recording paper or the paper on which the image has been formed, and acquires image information for performing various corrections (for example, misalignment correction and color correction). The inspection device 10 acquires the image information obtained by reading of the image reading unit 72.

The discharge unit 60 winds and accommodates the image-formed recording paper in a roll shape. Alternatively, the discharge unit discharges the image-formed paper.

In the above exemplary embodiment, an example in which the digital image information as the base of image formation is used as the correct image, and the image information obtained by performing image formation based on the image information of the correct image and then reading a recording medium such as paper is set as the target image for the inspection has been described. The exemplary embodiments may be applied to an inspection device that performs an AA (analog-analog) inspection in which image information obtained by reading a correct image as a predetermined reference is used as the correct image instead of the digital correct image.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The processes executed by the inspection device 10 according to the above exemplary embodiment may be processes executed by software, processes executed by hardware, or a combination of both cases. The processes executed by the units of the inspection device 10 may be stored in a storage medium as a program and distributed.

The present invention is not limited to the above description, and can be variously modified and implemented in a range without departing from the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An inspection device comprising:
a processor configured to
acquire image information of each of a correct image and a target image as an inspection target,
extract edge information of each of the correct image and the target image by using the acquired image information,
obtain a difference image between the correct image and the target image, and
in a case in which the correct image has an edge based on the edge information that has been extracted, set a threshold value for detecting a defect by using brightness information or color information of the correct image along with the edge information and detect a defect of the target image by using the difference image and the threshold value, wherein the threshold value differs based on the brightness of the correct image, whether the correct image has an edge, and whether the target image has an edge.

2. The inspection device according to claim 1,
wherein the processor is configured to change the threshold value to a value predetermined and predetermined contrast of the correct image, in a case of using the brightness information.

3. The inspection device according to claim 1,
wherein the processor is configured to change the threshold value to a value predetermined and predetermined contrast for each color region in the color information, in a case of using the color information.

4. The inspection device according to claim 1,
wherein the processor is configured to obtain a color difference as the difference image in a case of using the color information.

5. The inspection device according to claim 3,
wherein the processor is configured to obtain a color difference as the difference image in a case of using the color information.

6. The inspection device according to claim 1,
wherein the processor is configured to, in a case of using the color information, change the threshold value in a case where a color is a predetermined specific color.

7. The inspection device according to claim 4,
wherein the processor is configured to, in a case of using the color information, change the threshold value in a case where a color is a predetermined specific color.

8. The inspection device according to claim 5,
wherein the processor is configured to, in a case of using the color information, change the threshold value in a case where a color is a predetermined specific color.

9. The inspection device according to claim 1,
wherein the processor is configured to change the threshold value by further using edge peripheral information of a predetermined range of edges of the correct image and the target image.

10. The inspection device according to claim 2,
wherein the processor is configured to change the threshold value by further using edge peripheral information of a predetermined range of edges of the correct image and the target image.

11. The inspection device according to claim 3,
wherein the processor is configured to change the threshold value by further using edge peripheral information of a predetermined range of edges of the correct image and the target image.

12. The inspection device according to claim 4,
wherein the processor is configured to change the threshold value by further using edge peripheral information of a predetermined range of edges of the correct image and the target image.

13. The inspection device according to claim 5,
wherein the processor is configured to change the threshold value by further using edge peripheral information of a predetermined range of edges of the correct image and the target image.

14. The inspection device according to claim 6,
wherein the processor is configured to change the threshold value by further using edge peripheral information of a predetermined range of edges of the correct image and the target image.

15. The inspection device according to claim 7,
wherein the processor is configured to change the threshold value by further using edge peripheral information of a predetermined range of edges of the correct image and the target image.

16. The inspection device according to claim 1,
wherein the processor is configured to change the threshold value further by using object information of the correct image.

17. The inspection device according to claim 1,
wherein the processor is configured to
change an extraction threshold value used for extracting the edge information by using object information of the correct image, and
extract the edge information.

18. The inspection device according to claim 17,
wherein the processor is configured to change the extraction threshold value to a value predetermined for each type of object.

19. An image forming apparatus comprising:
the inspection device according to claim 1;
an image forming unit that forms an image on a recording medium by using the image information of the correct image generated in advance; and
a reading unit that reads the recording medium on which the image is formed by the image forming unit, to generate the image information of the target image.

20. A non-transitory computer readable medium storing an inspection program causing a computer to execute:
acquiring image information of each of a correct image and a target image as an inspection target;
extracting edge information of each of the correct image and the target image by using the acquired image information;
obtaining a difference image between the correct image and the target image; and
in a case in which the correct image has an edge based on the edge information that has been extracted, setting a threshold value for detecting a defect by using brightness information or color information of the correct image along with the edge information and detecting a defect of the target image by using the difference image and the threshold value, wherein the threshold value differs based on the brightness of the correct image, whether the correct image has an edge, and whether the target image has an edge.

* * * * *